(12) United States Patent
Yang et al.

(10) Patent No.: US 11,518,681 B2
(45) Date of Patent: Dec. 6, 2022

(54) SYSTEM AND METHOD FOR GRANULATING AND MOLDING SILICON LIQUID

(71) Applicant: ChengDu Silicon Technology Co., Ltd., Sichuan (CN)

(72) Inventors: Shi Yang, Sichuan (CN); Xu Zhou, Sichuan (CN)

(73) Assignee: ChengDu Silicon Technology Co., Ltd., Chengdu (CN)

( * ) Notice: Subject to any disclaimer, the term of this patent is extended or adjusted under 35 U.S.C. 154(b) by 789 days.

(21) Appl. No.: 16/467,108

(22) PCT Filed: Dec. 7, 2017

(86) PCT No.: PCT/CN2017/115078
§ 371 (c)(1),
(2) Date: Jun. 6, 2019

(87) PCT Pub. No.: WO2018/103710
PCT Pub. Date: Jun. 14, 2018

(65) Prior Publication Data
US 2020/0071169 A1    Mar. 5, 2020

(30) Foreign Application Priority Data
Dec. 9, 2016    (CN) .......................... 201611135660.6

(51) Int. Cl.
*B01J 2/06* (2006.01)
*C01B 33/021* (2006.01)
*C01B 33/02* (2006.01)

(52) U.S. Cl.
CPC ................ *C01B 33/02* (2013.01); *B01J 2/06* (2013.01); *C01B 33/021* (2013.01)

(58) Field of Classification Search
CPC ................ C01B 33/021; C01B 33/037; B22F 2009/0812; B22F 2009/0804; B22F 9/08;
(Continued)

(56) References Cited

U.S. PATENT DOCUMENTS 3,242,237 A * 3/1966 Belak ....................... C05G 5/38
                                                            71/64.11
4,230,477 A * 10/1980 Sharonov .................. C21B 3/08
                                                            65/141
(Continued)

FOREIGN PATENT DOCUMENTS

CN    101321696 A    12/2008
CN    103011167 A    4/2013
(Continued)

OTHER PUBLICATIONS

International search report of PCT Patent Application No. PCT/CN2017/115078 dated Mar. 5, 2018.

*Primary Examiner* — Mary Lynn F Theisen

(57) ABSTRACT

The present disclosure provides a system and method for granulating and molding silicon liquid. The system includes a silicon liquid transferring device, wherein cooling system and a lifting system matching with the cooling system are provided below the silicon liquid transferring device. The silicon liquid transferring device transfers smelted silicon liquid to a position above the cooling system, uniformly pours the silicon liquid into the cooling system according a set flow to enable the silicon liquid to be solidified into silicon pellets, and then the molded silicon pellets are extracted by the lifting system, solving the problem in the prior art of irregular molding and inconsistent size of silicon blocks caused by pouring. A container bottom and a diversion pipe are set to be of detachable structures, and can be
(Continued)

quickly disassembled and assembled as vulnerable parts without affecting the production.

9 Claims, 3 Drawing Sheets

(58) Field of Classification Search
CPC .................. B01J 2/06; C21B 2400/024; C21B 2400/032; C21B 2400/05; C21B 2400/062; C21B 2400/07; C21B 2400/072
See application file for complete search history.

(56) References Cited

U.S. PATENT DOCUMENTS

| | | | | | |
|---|---|---|---|---|---|
| 4,931,231 | A | * | 6/1990 | Teppo | ........................ B01J 2/06 264/13 |
| 5,258,053 | A | * | 11/1993 | Forwald | .................... B22F 9/08 75/335 |

FOREIGN PATENT DOCUMENTS

| CN | 206244415 U | 6/2017 |
|---|---|---|
| JP | 5424262 A | 2/1979 |

* cited by examiner

SYSTEM AND METHOD FOR GRANULATING AND MOLDING SILICON LIQUID

FIELD OF THE INVENTION

The present invention relates to the field of recycling silicon slag, more particularly to a granulating and molding system for silicon liquid.

BACKGROUND OF THE INVENTION

Silicon slag generally refers to a remainder in refining processes of a raw ore, which still contains a quantity of silicon. The silicon slag has various kinds such as industrial silicon slag, solar silicon slag, semiconductor silicon slag and the like. The silicon slag can be recycled and purified to address the problems of a lack of silicon and a high price. Silicomanganese slag, also called silicomanganese smelting slag, is industrial waste slag discharged from the smelting process of the silicomanganese alloy, which has a loose structure and an appearance of light green particles, and is composed of some irregular porous amorphous particles. The silicomanganese slag is fragile and brittle, and the bulk silicomanganese slag can be being crushed into small pieces by a crusher, the roughly crushed material is further pulverized in a fine crusher to ensure that the material entering the silo can reach a degree of monomeric liberation, and is then sorted by being evenly fed into a trapezoid jigger via a vibrating feeder and a belt conveyor. A main purpose of the crush is to break the aggregate structure, while a main purpose of the jigging is to recycle the silicomanganese alloy from the silicomanganese slag. The differences in specific gravity of the silicomanganese slag and the silicomanganese alloy are relatively large, the waste slag being able to be separated from the metal by the gravity separation function of the jigger, thereby obtaining pure alloy and waste slag, and in the end the concentrate ore and gangue being able to be dehydrated respectively by the dehydrating effect of the dewatering screen.

At present, most of the silicon slag processings still rely on manual selection, i.e. under certain crushing conditions, silicon blocks with high purity are manually selected, having an advantage of low cost, but bringing low efficiency and low utilization rate of silicon slag. However, the silicon blocks selected by the trapezoid jigger have low purity, the sorting cost is still high, and the utilization rate of silicon slag is also very low.

After smelting, silicon blocks which have a smelting point of 1414° C. become silicon fluid also known as silicon water. In the general process, the silicon smelting temperature may reach 1700° C. After being smelted, the silicon fluid is poured into the cooling pool to form silicon pellets or blocks, and the monatomic silicon is stored as raw material for industrial silicon. However, in the prior art, explosions tend to happen in the process of pouring silicon liquid. Generally, an inefficient and wasteful way to avoid the explosion is to extend the pouring time, which means, pouring of the silicon liquid is stopped when a certain amount of silicon liquid is poured, and extraction of the silicon blocks begins after natural cooling.

BRIEF SUMMARY OF THE INVENTION

The present invention aims to provide a granulating and molding system for silicon liquid to solve the problems that the molding time of the silicon liquid in the prior art is long, the cooling efficiency of the silicon blocks is low, and the equipment down time is long.

The present invention is realized by the following technical scheme:

A granulating and molding system for silicon liquid comprises a silicon liquid transferring device, wherein a cooling system and a lifting system matching with the cooling system are provided below the silicon liquid transferring device, wherein, the silicon liquid transferring device comprises a cylindrical container body and a container bottom matching with the container body, a lining is disposed in the container body, wherein the container bottom and the container body form a detachable structure, and at least one through hole and a detachable diversion pipe connected to the through hole are disposed on the container bottom. The present discloses a new silicon liquid molding system comprising three parts of the silicon liquid transferring device, the cooling system and the lifting system. The silicon liquid transferring device transfers the smelted silicon liquid to a position above the cooling system, and uniformly pours the silicon liquid into the cooling system according to a set flow rate to enable the silicon liquid to be solidified into silicon pellets; and then the molded silicon pellets are extracted by the lifting system. Specifically, the silicon liquid transferring device comprises a cylindrical container body, wherein a lower part of the container body is provided with a detachable container bottom which is provided with one or more through holes, a detachable diversion pipe is installed at the through hole, and an inner side of the container body is provided with a layer of lining. Since the smelting temperature of the silicon liquid is up to 1700° C., a lining is arranged on the inner side of the container to avoid any damage to the container body; meanwhile, the silicon liquid can be sequentially poured into the cooling pool by providing with the through hole at the container bottom and installing the diversion pipe, restricting the flow direction of the silicon liquid and solving the problem that the direction and speed cannot be controlled when pouring the silicon liquid. Moreover, due to the fixed diameter of diversion hole, the silicon liquid poured into the cooling pool can be formed into spherical structure with uniform diameter, thus solving the problem in the prior art of irregular molding and inconsistent size of silicon blocks caused by pouring. In addition, as the container bottom and the diversion pipe are detachable and vulnerable parts, they can be replaced with new detachable ones to facilitate quick disassembly and assembly without affecting production.

The container bottom is concaved downwards to form an arc structure; an insulating layer is arranged between the container body and the lining; an interval between a lower end of the insulating layer and the container body forms a cavity, and a sealing ring is installed in the cavity. The arc structure concaved downwards and disposed at the bottom of the container body can guide the silicon liquid to prevent the silicon liquid from being accumulated on the bottom of the container body to form solid, thus effectively preventing explosion. The insulating layer can effectively protect the container body from being damaged under high temperature. Upon removal of the container bottom, a stepped structure is formed at the detaching position among the container body, the insulating layer and the lining, and an outer end surface of the container bottom also has a stepped structure; wherein after the engagement, an outer shell of the container bottom is connected to the container body to form an integral structure; the lining on the container bottom is connected to the lining on the inner side of the container body to form an integral structure; and the cavity is formed between the insulating layer and the container body; wherein the sealing ring is installed in the cavity. The connection between the container body and the container bottom becomes tighter by configuring end surfaces of the container body, the insulating layer and the lining to be a stepped structure and installing a sealing ring in the cavity, ensuring the impermeability during the assembling process, and effectively preventing any leakage.

An outer side of the container body is provided with a plurality of lifting teeth, a hook matching with the lifting teeth is disposed at the container bottom, and the container body is connected to the container bottom through the engagement of the lifting teeth and the hook. The mutual matching of the lifting teeth and the hook allows the container bottom to be rotated so that it can be connected to the container body to form an integral structure or separated from the container body. Preferably, the contact surfaces of the lifting teeth and the hook can be set as inclined surfaces. Under the matching action of the inclined surfaces, the sealing ring can be pressed and fixed to realize the sealing performance.

The cooling system comprises a cylindrical cooling pool body, wherein at least a plurality of nozzles are disposed on an inner side of the cooling pool body and divided into one or more groups, the groups are respectively installed at different depths of the cooling pool, and nozzles of each of the groups are uniformly distributed on a circumference at a same depth, and the sprayed water flows into the cooling pool body along a tangential direction of the circumference. The existing cooling pools have different specifications and shapes, and generally take the shape of a cuboid. Since the cooling pool requires a period of time for heat dissipation and cooling, the efficiency is low. Also the weight of silicon blocks per unit volume in the cooling pool is small. The applicant has made detailed researches on the structure of the cooling pool to improve the service efficiency, wherein the applicant firstly increased a depth of the cooling pool and a distance of the relative movement between the silicon blocks and water, thus increasing the heat exchange efficiency. However, the increase in depth will lead to an infinite increase in cost and a great decrease in safety performance. In solving this problem, the applicant found that the formation of silicon blocks can be effectively facilitated by changing the movement track of silicon blocks falling into cooling water from vertical movement to spiral movement. Therefore, a plurality of nozzle groups are disposed on the side wall of the cooling pool body, the nozzle groups being distributed at different depths; wherein the nozzle groups each comprises one or more nozzles, and the spray direction of the nozzles is distributed along a tangential direction of the circumference of the cooling pool and is sprayed inwardly, in this way, one nozzle group can drive local cooling water to form a rotation in the cooling pool, so that the silicon liquid poured into the cooling pool will perform spiral motion under the drive of rotation of the water flow, thereby greatly facilitating the formation of the silicon bricks, and achieving the purposes of sufficient heat exchange and cooling. Moreover, the plurality of nozzle groups ensures rotating motion to be formed in different positions, producing a uniform flow field.

The silicon liquid granulation and molding system further comprises a circulating pool, wherein the nozzles are connected to the circulating pool through a pipeline, and a circulating pump is disposed on the pipeline, and a top of the cooling pool body is provided with an overflow weir connected to the circulating pool through a ditch. Furthermore, a circulating pool is arranged to ensure sufficient supply of cold water in the cooling pool and reduce the consumption of cold water, greatly reducing water consumption and achieving the environment-friendly and economical purposes.

The lifting system comprises a hoisting shaft connected to the cooling pool body through a channel, a guide plate inclined to the channel and disposed in the cooling pool body, and rotating wheels disposed at a bottom of and above the hoisting shaft, wherein a driving chain is installed between two rotating wheels, and a collecting hopper is disposed on the driving chain. The guide plate is obliquely arranged at the bottom of the cooling pool body, with the lowest part connected to the communication channel, thus, after being cooled and falling onto the bottom of the cooling pool, silicon pellets will gather in the communication channel under the action of the guide plate, and finally enter the lifting system through the communication channel, through which they can be lifted out of the hoisting shaft, realizing collecting and extracting of silicon pellets. To rotating wheels drive the driving chain as fixed pulleys and pull the operation of the driving chain. Under the driving action of a driving mechanism, the driving chain makes reciprocating rotation between two rotating wheels, drives the collecting bucket on the driving chain to lift silicon pellets and turns the collecting bucket over at the highest position to pour the silicon pellets out, and then the collecting bucket back to a status of to be loaded again, re-start the loading process, and so on. In the continuous forming process of silicon pellets, they are continuously picked up and transported, capable of forming a continuous production, thus solving the problem of suspending the extracting in the prior art and improving the production efficiency.

A shuttle chute matching with the collecting hopper and a collecting box are installed on the ground to guide the moving direction of silicon pellets, thus avoiding the impact and breakage of the silicon pellets and improving the yield. The hoisting shaft is deeper than the cooling pool body, and the top of the hoisting shaft is connected to the cooling pool body through an overflow channel.

A silicon liquid granulating and molding method comprises the following steps:

(a) pouring a smelted silicon liquid into a silicon liquid transferring device;

(b) moving the silicon liquid transferring device above a cooling pool body, and opening a stop valve to allow a silicon water to enter the cooling pool body in a columnar shape;

(c) during a rotation of cooling water in the cooling pool body, the silicon water being solidified into silicon pellets which move spirally under the drive of the cooling water and fall onto a guide plate;

(d) as the silicon pellets moving from the guide plate to a collecting hopper, lifting the silicon pellets out of a hoisting shaft under the drive of rotating wheels, and gathering the silicon pellets into a collecting box.

Compared to the existing art, the present invention has advantages and beneficial effects as follows:

1. The granulating and molding system and method for silicon liquid in the present invention protect the container body by providing a layer of lining at the inner side thereof, meanwhile, the silicon liquid can be sequentially poured into the cooling pool by providing with the through hole at the bottom of the container body and installing the diversion pipe, restricting the flow direction of the silicon liquid and solving the problem that the direction and speed cannot be controlled when pouring the silicon liquid. Moreover, due to the fixed diameter of the diversion hole, the silicon liquid poured into the cooling pool can be formed into spherical structure with uniform diameter, thus solving the problem in the prior art of irregular molding and inconsistent size of silicon blocks caused by pouring. In addition, as the container bottom and the diversion pipe are detachable and vulnerable parts, they can be replaced with new detachable ones to facilitate quick disassembly and assembly without affecting production.

2. The granulating and molding system and method for silicon liquid in the present invention change the movement track of silicon blocks falling into cooling water from vertical movement to spiral movement, which can effectively facilitate the formation of silicon blocks. Therefore, the plurality of nozzle groups are disposed on the side wall of the cooling pool body, the nozzle groups being distributed at different depth positions; wherein the nozzle groups each comprises one or more nozzles, and the spray direction of the nozzles is distributed along a tangential direction of the circumference of the cooling pool and is sprayed inwardly, in this way, one nozzle group can drive local cooling water to form a rotation in the cooling pool, so that the silicon liquid poured into the cooling pool will perform spiral motion under the drive of rotation of the water flow, thereby greatly facilitating the formation of the silicon bricks, and achieving the purposes of sufficient heat exchange and cooling. Moreover, the plurality of nozzle groups ensures rotating motion to be formed in different positions, producing a uniform flow field.

3. The granulating and molding system and method for silicon liquid in the present invention build a hoisting shaft next to the cooling pool and arrange a guide plate at the bottom of the cooling pool body, the bottom of the hoisting shaft is connected to the cooling pool body through a communication channel, the guide plate is obliquely disposed, with the lowest part connected to the communication channel. Thus, after being cooled and falling onto the bottom of the cooling pool, silicon pellets will gather in the communication channel under the action of the guide plate, and finally enter the lifting system through the communication channel, through which they can be lifted out of the hoisting shaft, realizing collecting and extracting of silicon pellets. In the continuous forming process of silicon pellets, they are continuously picked up and transported, capable of forming a continuous production, thus solving the problem of suspending the extracting in the prior art and improving the production efficiency.

4. The granulating and molding system and method for silicon liquid in the present invention dispose a circulating pool to ensure sufficient supply of cold water in the cooling pool and reduce the consumption of cold water, greatly reducing water consumption and achieving the environment-friendly and economical purposes.

BRIEF DESCRIPTION OF THE DRAWINGS

The figures described herein are used to provide a further understanding of the embodiments of the present invention and constitute a part of the present invention but without limiting the embodiments of the present invention. In the figures.

Names of the annotations in the figures and corresponding parts are.

1—cooling pool body, 2—nozzles, 3—guide plate, 4—circulating pool, 5—pipeline, 6—circulating pump, 7—overflow weir, 8—ditch, 9—hoisting shaft, 10—channel, 11—rotating wheels, 12—collecting hopper, 13—shuttle chute, 14—collecting box, 21—container body, 22—lining, 23—diversion pipe, 24—insulating layer, 25—lifting lug, 26—stop valve, 27—container bottom, 28—sealing ring, 29—lifting teeth, 30—hook.

DETAILED DESCRIPTION OF THE PREFERRED EMBODIMENTS

In order to make the purpose, technical scheme and advantages of the present invention understood more clearly, the present invention will be further described in detail in combination with drawings and preferred embodiments. The exemplary embodiments of the present invention and description thereof are used to explain the present invention, but not improperly limit thereto.

EXAMPLE

Figure 1:
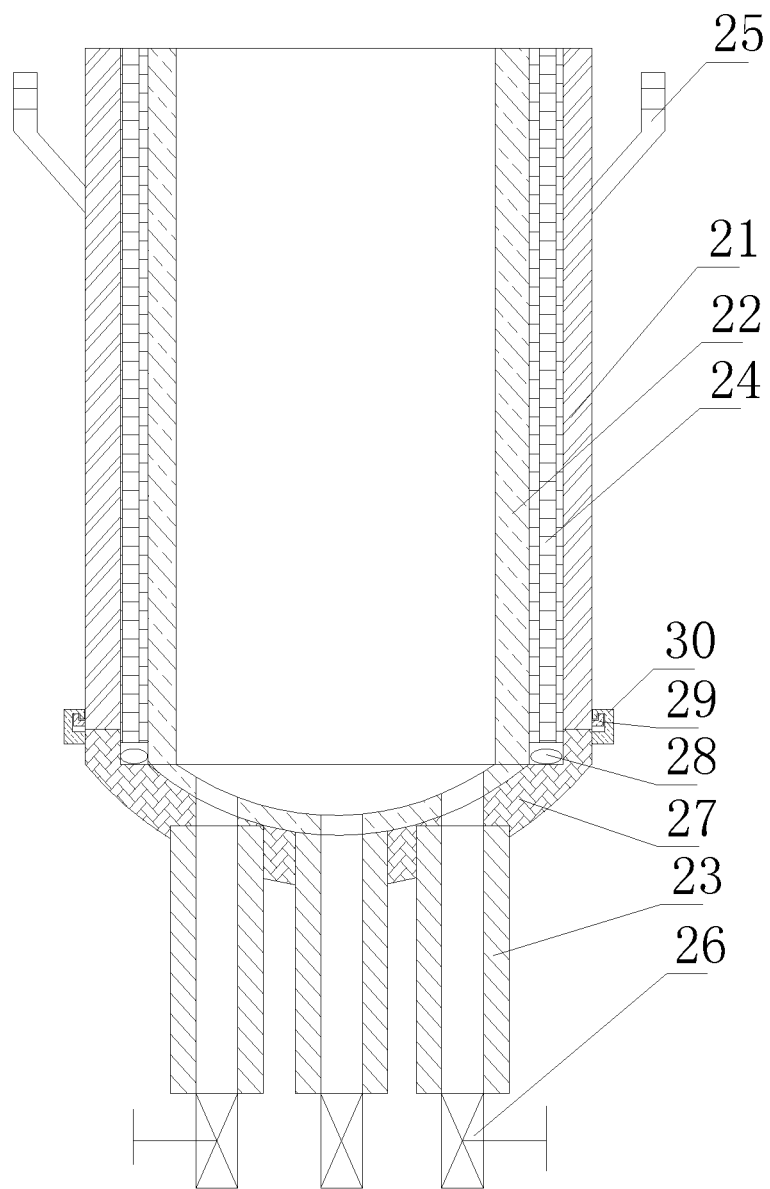
FIG. 1 is a structural schematic diagram of the silicon liquid transferring device of the present invention.
Figure 2:
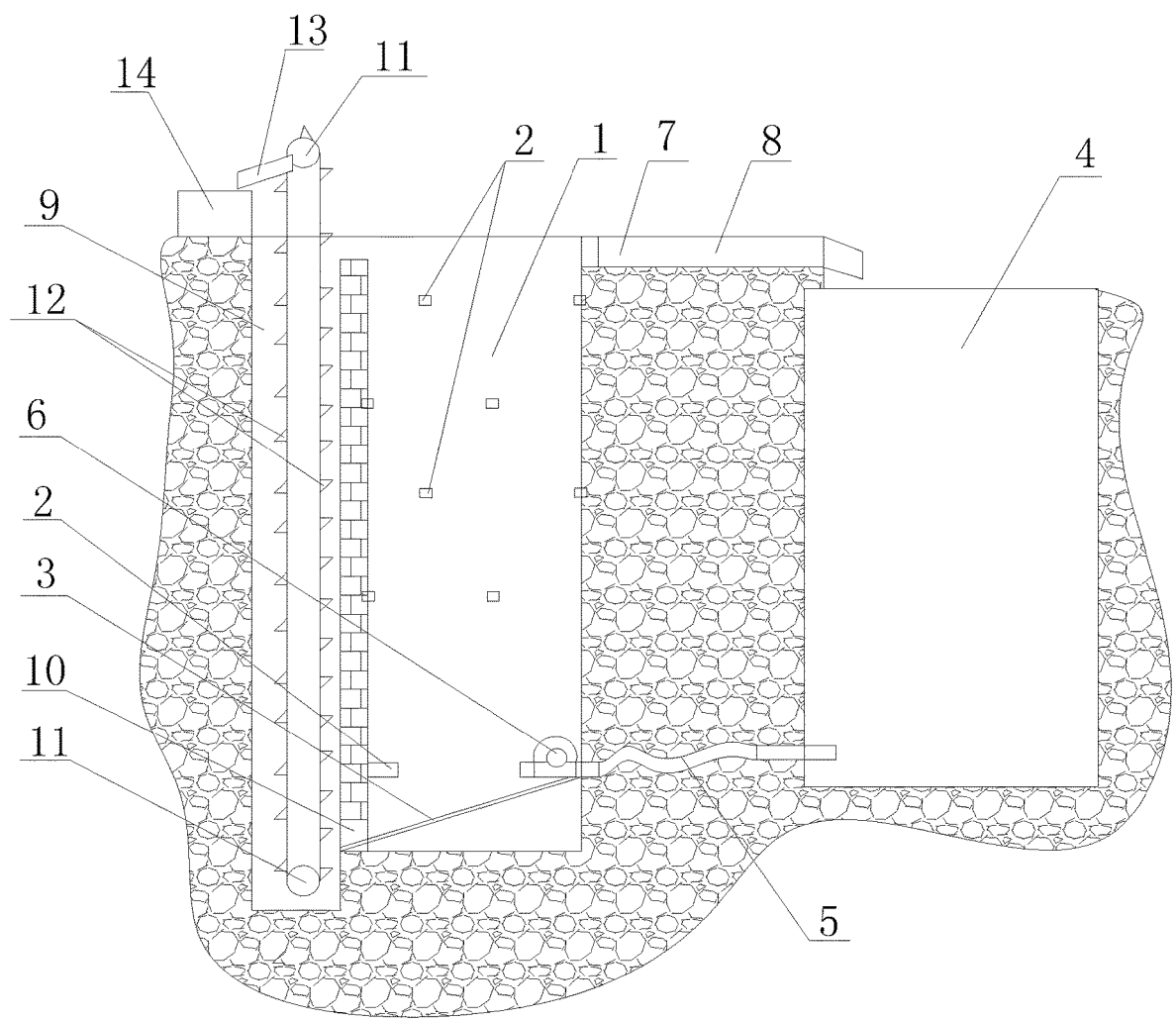
FIG. 2 is a structural schematic diagram of the cooling system and lifting system of the present invention.
Figure 3:
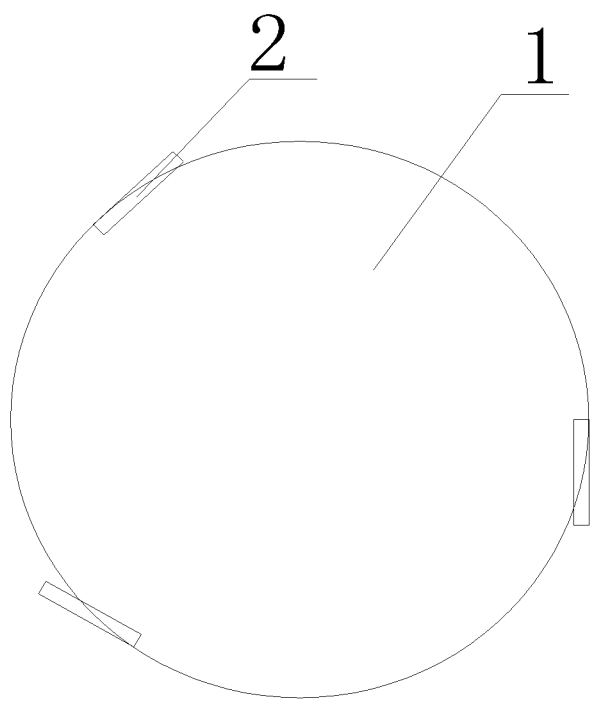
FIG. 3 shows the distribution of the nozzles in one group according the example of the present invention.

As shown in FIG. 1 to FIG. 3, the silicon liquid granulating and molding system of the invention comprises three parts of a silicon liquid transferring device, a cooling system and a lifting system; wherein the silicon liquid transferring device transfers the smelted silicon liquid to a position above the cooling system, uniformly pours the silicon liquid into the cooling system according to a set flow rate to enable the silicon liquid to be solidified into silicon pellets; and then the molded silicon pellets are extracted by the lifting system. Specifically, the silicon liquid transferring device comprises a cylindrical container body 21 and a container bottom 27 matching with the container body 21, wherein a lining 22 is disposed in the container body 21; the container bottom 27 and the container body 21 form a detachable structure, and at least one through hole and a detachable diversion pipe 23 connected to the through hole are arranged on the container bottom 27. The lower part of the container body 21 is closed to form the bottom of the container where one or more through holes are arranged, the diversion pipe 23 which is detachable is installed at the through hole, the lining 22 is arranged at the inner side of the container body 21, an insulating layer 24 is arranged between the container body 21 and the inner lining 22, a stepped structure is formed at the detaching position among the container body 21, the insulating layer 24 and the lining 22, and the outer end surface of the container bottom 27 also has a stepped structure, thus after engagement, the outer shell of the container bottom 27 is connected to the container body 21 as an integral structure; the lining 22 on the container bottom 27 is connected to the lining 22 on the inner side to form an integral structure; a cavity between the insulating layer 24 and the container bottom 27 is formed, and a sealing ring 28 is installed in the cavity. The connection between the container body 21 and the container bottom 27 becomes tighter by configuring end surfaces of the container body 21, the insulating layer 24 and the lining 22 to be a stepped structure and installing a sealing ring 28 in the cavity. The outer side of the container body 21 is provided with a plurality of lifting teeth 29, a hook 30 matching with the lifting teeth 29 is disposed at the container bottom 27, and the container body 21 is connected to the container bottom 27 through the engagement of the lifting teeth 29 and the hook 30. Preferably, the contact surfaces of the lifting teeth 29 and the hook 30 can be set as inclined surfaces. Under the matching action of the inclined surfaces, the sealing ring 28 can be pressed and fixed to realize the sealing performance. Since the smelting temperature of the silicon liquid is up to 1700° C., the lining 22 is arranged on the inner side of the container to avoid any damage to the container body. The bottom of the container body 21 is made into an arc-shaped structure concaved downwards to guide the silicon liquid. The through holes are arranged at the bottom of the container body 21 and with a diversion pipe 23 installed in so that silicon liquid can be sequentially poured into the cooling pool. The diversion pipe 23 is provided with a stop valve 26 for controlling the flow rate and the velocity, and three lifting lugs 25 uniformly distributed at the same horizontal position are disposed on the outer side of the container body 21, wherein the number of the lifting lugs 25 can be appropriately increased.

The cooling system comprises a cylindrical cooling pool body 1 and a circulating pool 4, wherein the cooling pool body 1 and the circulating pool 4 are both excavated on the ground and the side walls thereof are built to form a complete structure, the bottom of the circulating pool 4 is connected to a circulating pump 6 through a pipeline 5, and the output pipeline of the circulating pump 6 is connected to a plurality of nozzles 2. In this example, the cooling pool body 1 has a diameter of 4 m and a depth of 16 m, and there are twelve nozzles 2 in total divided into 4 groups. Four groups of nozzles 2 are respectively arranged at water depth of 1 m, 4 m, 8 m and 12 m, each of the four groups has three nozzles 2 evenly distributed on the circumference, and the nozzles at two adjacent layers are in a staggered distribution so that the nozzles 2 are evenly distributed on a surface of a cylinder as a whole. When the circulation pump 6 is started, cold water of the circulating pool 4 is pressurized and sprayed out from the nozzles at a certain speed to drive the rotation of the water in the cooling tank body 1. The hoisting shaft 9 has a depth of 18 m, the cooling pool body 1 is connected to the hoisting shaft 9 through a channel 10, a guide plate 3 inclined to the channel 10 is disposed in the cooling pool body 1, two rotating wheels 11 are disposed respectively at the bottom of and above the hoisting shaft 9, a driving chain is connected between the two rotating wheels 11, and a collecting hopper 12 is disposed on the driving chain. Under the driving action of a driving mechanism, the driving chain makes reciprocating rotation between the two rotating wheels 11, drives the collecting bucket 12 on the driving chain to lift the silicon pellets and turn the silicon pellets over at the highest position to pour the silicon pellets out, and then the collecting bucket 12 back to a status of to be loaded again. Moreover, a shuttle chute 13 matching with the collecting hopper 12 and a collecting box 14 are installed on the ground. The hoisting shaft 9 is deeper than the cooling pool body 1, and the top of the hoisting shaft 9 is connected to the cooling pool body 1 through an overflow channel. For the cooling water continuously enters the cooling pool body 1, and the surplus water needs to be re-entered the circulating pool 4, the overflow weir 7 is disposed on the top of the cooling pool body 1 and is connected to the circulating pool 4 through a ditch 8 to realize the cyclic utilization of the cooling water.

The method for granulating and molding silicon liquid using the devices in the present invention comprises following steps:

(a) pouring the smelted silicon liquid into the silicon liquid transferring device;

(b) moving the silicon liquid transferring device above the cooling pool body 1, and opening the stop valve 26 to allow the silicon water to enter the cooling pool body 1 in a columnar shape;

(c) during a rotation of cooling water in the cooling pool body 1, the silicon water being solidified into silicon pellets which move spirally under the drive of the cooling water and fall onto the guide plate 3;

(d) as the silicon pellets moving from the guide plate 3 to the collecting hopper 12, lifting the silicon pellets out of the hoisting shaft 9 under the drive of the rotating wheels 11, and gathering the silicon pellets into a collecting box 14.

The aforementioned embodiments and examples further illustrate the purposes, technical solutions and beneficial effects of the present invention in detail. It is to be understood that the foregoing is only the embodiments of the present invention, and is not intended to limit the scope of the present invention. Any modifications, equivalent substitutes, improvements and the like made within the spirit and principle of the present invention should all be included in the scope of the present invention.

What is claimed is:

1. A system for granulating and molding silicon liquid, characterized in that, the system comprises a silicon liquid transferring device, wherein a cooling system and a lifting system matching with the cooling system are provided below the silicon liquid transferring device, wherein, the silicon liquid transferring device comprises a cylindrical container body and a container bottom matching with the container body, a lining is disposed in the container body, wherein the container bottom and the container body form a detachable structure, and at least one through hole and a detachable diversion pipe connected to the through hole are disposed on the container bottom.

2. The system for granulating and molding silicon liquid according to claim 1, characterized in that, the container bottom is concaved downwards to form an arc structure; an insulating layer is arranged between the container body and the lining; an interval between a lower end of the insulating layer and the container body forms a cavity, and a sealing ring is installed in the cavity.

3. The system for granulating and molding silicon liquid according to claim 1, characterized in that, an outer side of the container body is provided with a plurality of lifting teeth, a hook matching with the lifting teeth is disposed at the container bottom, and the container body is connected to the container bottom through the engagement of the lifting teeth and the hook.

4. The system for granulating and molding silicon liquid according to claim 1, characterized in that, the cooling system comprises a cylindrical cooling pool body, wherein a plurality of nozzles are disposed on an inner side of the cooling pool body and divided into one or more groups, the groups are respectively installed at different depths of the cooling pool, and nozzles of each of the groups are uniformly distributed on a circumference at a same depth, and the sprayed water flows into the cooling pool body along a tangential direction of the circumference.

5. The system for granulating and molding silicon liquid according to claim 4, characterized in that, the system further comprises a circulating pool, wherein the nozzles are connected to the circulating pool through a pipeline, and a circulating pump is disposed on the pipeline.

6. The system for granulating and molding silicon liquid according to claim 4, characterized in that, a top of the cooling pool body is provided with an overflow weir connected to the circulating pool through a ditch.

7. The system for granulating and molding silicon liquid according to claim 1, characterized in that, the lifting system comprises a hoisting shaft connected to the cooling pool body through a channel, a guide plate inclined to the channel and disposed in the cooling pool body, and rotating wheels disposed at a bottom of and above the hoisting shaft, wherein a driving chain is installed between two rotating wheels, and a collecting hopper is disposed on the driving chain.

8. The system for granulating and molding silicon liquid according to claim 7, characterized in that, a shuttle chute matching with the collecting hopper and a collecting box are installed on a ground.

9. The system for granulating and molding silicon liquid according to claim 7, characterized in that, the hoisting shaft is deeper than the cooling pool body, and a top of the hoisting shaft is connected to the cooling pool body through an overflow channel.

* * * * *